United States Patent [19]

Araki et al.

[11] Patent Number: 4,885,208

[45] Date of Patent: Dec. 5, 1989

[54] MAGNETIC RECORDING MEDIUM

[75] Inventors: Hiroaki Araki; Kiyomi Ejiri; Takao Ohya, all of Kanagawa, Japan

[73] Assignee: Fuji Photo Film Co., Ltd., Kanagawa, Japan

[21] Appl. No.: 81,513

[22] Filed: Aug. 5, 1987

[30] Foreign Application Priority Data

Aug. 5, 1986 [JP]  Japan .................................. 61-184631

[51] Int. Cl.$^4$ ................................................ G11B 5/70
[52] U.S. Cl. .................................. 428/403; 428/694; 428/900
[58] Field of Search ..................... 428/694, 695, 403

[56] References Cited

U.S. PATENT DOCUMENTS

| 4,152,485 | 5/1989 | Mizumura | 428/64 |
| 4,253,886 | 3/1981 | Aonuma | 427/127 |
| 4,368,237 | 1/1983 | Yamada | 428/900 |
| 4,404,253 | 9/1983 | Kohler | 428/900 |
| 4,501,610 | 2/1985 | Yazu | 428/900 |
| 4,585,697 | 4/1986 | Kato | 428/403 |
| 4,678,705 | 7/1987 | Huisman | 428/694 |

FOREIGN PATENT DOCUMENTS 29932  2/1985  Japan .................................. 428/900

*Primary Examiner*—Paul J. Thibodeau
*Attorney, Agent, or Firm*—Sughrue, Mion, Zinn, Macpeak & Seas

[57] ABSTRACT

A magnetic recording medium comprising a nonmagnetic support and a magnetic recording layer provided on the support, wherein the magnetic recording layer contains a compound having a polar group (i.e., a carboxylic acid group, a carboxylic acid salt group, a sulfonic acid group or a sulfonic acid salt group) which is bonded to an aromatic ring directly or indirectly through a polymethylene group having not more than 4 carbon atoms or an unsaturated straight-chain hydrocarbon group having not more than 4 carbon atoms.

9 Claims, No Drawings

MAGNETIC RECORDING MEDIUM

BACKGROUND OF THE INVENTION

1. Field of the Invention

The present invention relates to a magnetic recording medium comprising a nonmagnetic support and a magnetic recording layer.

2. Description of Prior Art

A magnetic recording medium is widely employed as a recording medium such as an audio tape, a video tape and a floppy disk. The magnetic recording medium essentially comprises a nonmagnetic support and a magnetic recording layer provided thereon which comprises a binder and a ferromagnetic powder dispersed therein.

The magnetic recording medium is basically required to be at a high level in various properties such as electromagnetic conversion characteristics, running endurance and running property. Particularly, a video tape is desired to have excellent electromagnetic conversion characteristics such as high video output and high reproducibility of an original image, according to recent spread of an 8 mm-type tape recorder and the like.

For enhancing the electromagnetic conversion characteristics of the magnetic recording medium, a variety of methods are known. For example, the enhancement of electromagnetic conversion characteristics can be directly and effectively accomplished by improving properties of a ferromagnetic powder. For this reason, the ferromagnetic powder recently has been more minimized so as to make a higher density recording system possible. Moreover, as a material of the ferromagnetic powder, a conventional iron oxide has been replaced with a modified iron oxide such as Co-modified iron oxide, and recently further replaced with a ferromagnetic metal such as iron, nickel and cobalt, or a ferromagnetic metal alloy containing such metal.

Using thus improved ferromagnetic powder, it should be possible to obtain a magnetic recording medium having high electromagnetic conversion characteristics. However, it is practically difficult to prepare a magnetic recording medium which is enhanced in electromagnetic conversion characteristics in proportion to the improvement of a ferromagnetic powder. The reason is considered as follows. A ferromagnetic powder tends to decrease in the dispersibility in a binder, as its particle size is made smaller, or the ferromagnetic powder has such properties that its dispersibility tends to decrease, for example, in the order of γ-iron oxide, Co-containing γ-iron oxide and ferromagnetic metal powder. Therefore, it is sometimes brought about by the improvement of a ferromagnetic powder that the ferromagnetic powder is more poorly dispersed in a magnetic recording layer. Accordingly, excellent properties of the ferromagnetic powder is not shown sufficiently even by using the improved ferromagnetic powder.

In order to improve such unfavorably dispersed condition of the ferromagnetic powder in the magnetic recording layer, prolongation of period for a procedure of kneading or dispersing contained in the preparation of a magnetic paint is known. However, this prolonged procedure sometimes deteriorates properties of the ferromagnetic powder because a large shearing force is applied to the ferromagnetic powder in the kneading or dispersing procedure. Further, from the viewpoint of working efficiency, it is unfavorable to take a long period of time in the preparation of a magnetic recording medium.

For coping with the above-mentioned various drawbacks, there have been studied methods of effectively dispersing a ferromagnetic powder without drastic change of the conventional process for the preparation of a magnetic recording medium. For instance, a method of using a ferromagnetic powder having been treated with a surface treating agent such as a silane coupling agent and a method of using a component for enhancing the dispersibility of a ferromagnetic powder (i.e., dispersing agent) such as a fatty acid are known.

The present inventors have found that the ferromagnetic powder is not satisfactorily dispersed in a magnetic recording layer even in the case of utilizing the above-described methods.

In more detail, since the ferromagnetic powder having been treated with a silane coupling agent is made hydrophilic on its surface owing to the attached silane coupling agent, the dispersibility of the ferromagnetic powder in the magnetic paint is generally enhanced, but on the contrary, an affinity thereof for the resin component sometimes lowers. Hence, the ferromagnetic powder is still poorly dispersed in the magnetic recording layer. Further, the silane coupling agent is very expensive, so that the silane coupling agent is generally unsuitable for treating the ferromagnetic powder of a magnetic recording medium, from the econmical viewpoint.

A fatty acid generally contained as a lubricant in a magnetic recording layer of a magnetic recording medium also has a function of dispersing a ferromagnetic powder. Accordingly, adjustment of the amount of the fatty acid makes it possible to improve the dispersibility of a ferromagnetic powder. However, in the case of using the fatty acid as a dispersing agent, the fatty acid should be generally employed in a larger amount than that used as a lubricant to obtain a satisfactory effect. It is known that the fatty acid also serves as a plasticizer for the binder when an excessive amount thereof is employed, and as a result, the binder is inevitably plasticized when a large amount of the fatty acid is used as a dispersing agent for the ferromagnetic powder.

SUMMARY OF THE INVENTION

It is an object of the present invention to provide a magnetic recording medium highly improved in electromagnetic conversion characteristics.

More particularly, the object of the invention is to provide a magnetic recording medium which is enhanced in electromagnetic conversion characteristics by improving dispersing condition of a ferromagnetic powder in a magnetic recording layer so that the ferromagnetic powder sufficiently exhibits its properties.

There is provided by the present invention a magnetic recording medium comprising a nonmagnetic support and a magnetic recording layer provided on the support, said magnetic recording layer comprising a binder and a ferromagnetic powder dispersed therein, wherein in that said magnetic recording layer contains a compound having a polar group selected from the group a carboxylic acid group, a carboxylic acid salt group, a sulfonic acid group and a sulfonic acid salt group which is bonded to an aromatic ring directly or indirectly through a polymethylene group having not more than 4 carbon atoms or a unsaturated straight-chain hydrocarbon group having not more than 4 carbon atoms.

The magnetic recording medium of the present invention contains in the magnetic recording layer a compound having a polar group such as a sulfonic acid group, a sulfonic acid salt group, a carboxylic acid group, or a carboxylic acid salt group, each having an aromatic ring. The polar group of the above-mentioned compound serves for well dispersing the ferromagnetic powder to improve dispersing condition of the ferromagnetic powder in the recording layer. In more detail, the employment of the above-mentioned specific compound containing the polar group makes it possible to well disperse a ferromagnetic powder in the magnetic recording layer so as to smoothen a surface of the recording layer, whereby a maximum flux density and a squareness ratio of the recording layer increase. Accordingly, the magnetic recording medium of the present invention shows high electromagnetic conversion characteristics.

DETAILED DESCRIPTION OF THE INVENTION

A magnetic recording medium of the invention basically comprises a nonmagnetic support and a magnetic recording layer provided on the support. The magnetic recording layer comprises a binder and a ferromagnetic powder (i.e., ferromagnetic material) dispersed therein.

As a material of the nonmagnetic support, there can be mentioned those conventionally employed. Examples of the nonmagnetic support material include synthetic resins such as polyethylene, terephthalate, polypropylene, polycarbonate, polyethylene naphthalate, polyamide, polyamideimide, and polyimide; and metallic foils such as aluminum foil and stainless steel foil. The thickness of the nonmagnetic support is generally in the range of from 3 to 50 μm, preferably in the range of from 5 to 30 μm.

The nonmagnetic support may have a back layer (or backing layer) on the opposite side of the side where a magnetic recording layer is to be coated.

The magnetic recording medium of the invention has the above-described nonmagnetic support and a magnetic recording layer comprising a ferromagnetic powder dispersed in a binder, as described above.

Examples of the ferromagnetic powder includes a metal oxide-type ferromagnetic powder such as a powder of $\gamma$-$Fe_2O_3$, $Fe_3O_4$ or beltrite, a modified metal oxide-type ferromagnetic powder such as a powder of barium ferrite or Co-containing $\gamma$-$Fe_2O_3$, and a ferromagnetic metal powder mainly containing a ferromagnetic metal such as iron.

There is no specific limitation with respect to the shape of the ferromagnetic powder employable in the magnetic recording medium of the invention, but generally used is a ferromagnetic powder in needle shape, grain shape, disc shape, rice shape or plate shape.

The present invention is advantageously applied to a magnetic recording medium using a ferromagnetic metal powder which is inferior to other ferromagnetic powders in the dispersibility. Particularly, the invention is effectively utilized in the case of using a ferromagnetic metal powder containing iron, cobalt or nickel and having a specific surface area (S-BET) of not less than 42 $m^2/g$, preferably not less than 45 $m^2/g$.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. Processes for the preparation of those ferromagnetic metal powders are already known, and the ferromagnetic metal powder employed in the invention can be prepared by the known processes.

In the recording layer of the magnetic recording medium of the invention is contained any of generally employed binder in an amount of 10-40 parts by weight, preferably 15-30 parts by weight, based on 100 parts by weight of the above-mentioned ferromagnetic powder.

Examples of the resin employable as a binder include cellulose derivatives, vinyl chloride copolymers such as vinyl chloride/vinyl acetate copolymers containing other component (e.g., vinyl chloride/vinyl acetate/maleic anhydride copolymer) and vinyl chloride/vinyl acetate copolymers, vinylidene chloride copolymers, polyester resins, acrylic resins, polyvinyl acetal resins, polyvinyl butyral resins, phenoxy resins, epoxy resins, butadiene/acrylonitrile copolymers, polyurethane resins, and urethane epoxy resins. These resins can be employed singly or in combination.

Among the above-mentioned resins, preferred is a combination of a polyurethane resin and a vinyl chloride copolymer. In the case of using such combination, at least one of those resins preferably contains a repeating unit having a polar group.

Examples of the repeating unit having a polar group contained in the vinyl chloride copolymer include —COOM, —$SO_3M^1$, —$OSO_3M^1$ and —$PO(OM^1)_2$, in which $M^1$ is hydrogen or an alkali metal atom. These polar groups may be contained in the vinyl chloride copolymer singly or in combination.

Preferably employed in the invention is a vinyl chloride copolymer containing a repeating unit having —$SO_3Na$ and/or a repeating unit having —COOH.

The above-mentioned repeating unit having a polar group is contained in the vinyl chloride copolymer in an amount of generally 0.001 to 5.0 mol%, preferably 0.05 to 3.0 mol%. When the amount of the repeating unit having a polar group is less than 0.001 mol%, the ferromagnetic powder is liable to be poorly dispersed. When the amount of the repeating unit exceeds 5.0 mol%, the vinyl chloride copolymer becomes hygroscopic, whereby the resulting magnetic medium is decreased in the weathering resistance.

It is preferred that the vinyl chloride copolymer further contains a repeating unit having an epoxy group. The epoxy group contained in the vinyl chloride copolymer mainly serves to stabilize the vinyl chloride copolymer, and also serves to restrain a dehydrochlorination reaction of the copolymer proceeding with time.

In the case that the vinyl chloride copolymer contains a repeating unit having an epoxy group, the amount of the repeating unit having an epoxy group is preferably in the range of 1 to 30 mol%. The vinyl chloride copolymer contains the repeating unit having an epoxy group in an amount of generally 0.01 to 0.5 mol, preferably 0.01 to 0.3 mol, per 1 mol of the vinyl chloride repeating unit.

The above-described vinyl chloride copolymer generally has a number-average molecular weight ranging from 10,000 to 100,000, preferably 15,000 to 60,000.

The vinyl chloride copolymer having the above-mentioned polar group can be prepared by copolymerizing a vinyl chloride monomer and a monomer having a polar group and a reactive double bond such as 2-(meth-)acrylamide-2-methylpropanesulfonic acid, vinyl sulfonic acid, alkali metal salt thereof, (meth)acrylic acid-ethyl 2-sulfonate, alkali metal salt thereof, maleic anhydride (meth)acrylic acid, and a (meth)acrylic acid-2-phosphoric acid ester, according to known methods.

For introducing the epoxy group, glycidyl (meth)acrylate is generally employed as a monomer having a reactive double bond and an epoxy group.

A method for incorporating a polar group into a vinyl chloride copolymer employable in the invention is by no means restricted to the above-described one, and other methods can be also employed. For instance, vinyl chloride and vinyl alcohol are subjected to a polymerization reaction to produce a vinyl chloride copolymer having a polyfunctional base, —OH, and thus produced copolymer is caused to react with a compound containing a polar group and a chlorine atom (e.g., monochloroacetic acid, or epichlorohydrin for the introduction of epoxy group), namely, dehydrochlorination reaction, to incorporate a polar group into the copolymer.

In the preparation of a vinyl chloride polymer, other monomers such as vinyl ether, α-monoolefin, acrylic acid ester, unsaturated nitrile, aromatic vinyl and vinyl ester can be employed, as far as those monomers do not give an adverse effect to the vinyl chloride copolymer.

Examples of the repeating unit having a polar group contained in the polyurethane resin include —$SO_3M^1$, —$OSO_3M^1$, —$COOM^1$ and —$PO(OM^1)_2$, in which $M^1$ has the same meaning as defined hereinbefore. The repeating unit may be contained in the polyurethane resin singly or in combination.

Preferably employed in the invention is a polyurethane resin containing a repeating unit having —$SO_3Na$ and/or a repeating unit having —COOH.

The above-mentioned repeating unit having a polar group is contained in the polyurethane resin in an amount of generally 0.001 to 5.0 mol%, preferably 0.01 to 2.0 mol%. When the amount of the repeating unit having a polar group is less than 0.001 mol%, the ferromagnetic powder is liable to be poorly dispersed. When the amount of the repeating unit exceeds 5.0 mol%, the polyurethane resin becomes hygroscopic, whereby the resulting medium magnetic is decreased in the weathering resistance.

The polyurethane resin having such repeating unit can be prepared, for instance, by the following process.

A polyurethane resin is generally produced by reaction of a polyisocyanate compound with a polyol component. As the polyol component, there is generally used polyester polyol which is produced by a reaction of polyol with a polybasic acid.

The above-described conventional process can be applied to the preparation of a polyurethane resin employable in the invention. In more detail, a polar group is introduced into polyester polyol using a polybasic acid having a polar group as a portion of the polybasic acid or polyol, or by using polyol having a polar group, and thus obtained polyester polyol is caused to react with a polyisocyanate compound to prepare a polyurethane resin.

Examples of the polybasic acid having a polar group or polyol having a polar group include 5-sulfoisophthalic acid, 2-sulfoisophthalic acid, 4-sulfophthalic acid, 3-sulfophthalic acid, dialkyl 5-sulfoisophthalate, dialkyl 2-sulfoisophthalate, alkyl 4-sulfophthalate, alkyl 3-sulfophthalate, sodium salts thereof, potassium salts thereof, dimethylol propionic acid, sodium salts thereof and potassium salts thereof.

The above-mentioned reaction is already known, and a polyurethane resin can be prepared by utilizing the known reaction.

As a polyol component having no polar group or a polybasic acid having no polar group also employable in the preparation of polyester polyol, there can be mentioned those conventionally employed.

The polyester polyol having a specific polar group obtained as above generally has a number-average molecular weight ranging from 500 to 8,000.

As the polyisocyanate compound to be employed for the reaction with the above-mentioned polyester polyol, known polyisocyanate compounds can be employed.

The polyurethane resin preferably has a number-average molecular ranging from 10,000 to 200,000, more preferably 15,000 to 60,000.

A method for incorporating a polar group into the polyurethane resin employable in the invention is by no means restricted to the above-described one, and other methods can be also employed. For instance, a polyurethane resin incorporated with a polyfunctional base, —OH, is first produced, and the polyurethane resin is caused to react with a compound containing a polar group and and a chlorine atom (e.g., monochloroacetic acid), namely, dehydrochlorination reaction, to incorporate a polar group into the polyurethane resin.

In the case of using a combination of the above-mentioned vinyl chloride copolymer and polyurethane resin as a binder in the present invention, the ratio between the vinyl chloride copolymer and the polyurethane resin is generally in the range from 35:65 to 80:20 (polyurethane resin:vinyl chloride copolymer), preferably in the range of from 40:60 to 70:30, by weight. A ferromagnetic powder tends to be better dispersed in the magnetic recording layer in the case of using the above-mentioned combination than in the case of using other resin components. In the present invention, the dispersibility of the ferromagnetic powder is improved by employing a specific acid compound or its salt which will be described in detail hereinafter, and further the ferromagnetic powder is easily dispersed in a binder by using the above-mentioned combination (resin component) as the binder. Hence, the resulting magnetic recording medium is furthermore enhanced in the electromagnetic conversion characteristics owing to joint action of the resin component and the acid component (or its salt).

The binder is preferably a cured material of the combination of vinyl chloride copolymer and polyurethane resin which is added with a polyisocyanate compound.

As the polyisocyanate compound, there can be mentioned those conventionally employed. Examples of the polyisocyanate compound include a reaction product of 3 moles of a diisocyanate (e.g., diphenylmethane-4,4'-diisocyanate, tolylene diisocyanate and xylylene diisocyanate) and 1 mol of trimethylolpropane, a buret adduct compound of 3 moles of hexamethylene diisocyanate, an isocyanurate adduct compound of 5 moles of tolylene diisocyanate, an isocyanurate adduct compound of 3 moles of tolylene diisocyanate and 2 moles of hexamethylene diisocyanate, and a polymer of diphenylmethane diisocyanate.

The polyisocyanate compound is generally used in the same amount or an amount of not more than that of the polyurethane resin.

By using the above-mentioned polyurethane resin, vinyl chloride copolymer and a polyisocyanate compound as a binder, the polyisocyanate compound forms a three-dimensionally crosslinking structure between the polyurethane resin and the vinyl chloride copolymer, whereby a binder of high strength can be obtained.

In the magnetic recording medium of the invention, a magnetic recording layer comprising the aforementioned ferromagnetic powder dispersed in a binder composed of the above resin components contains a compound having a polar group such as a carboxylic acid group, a group of its salt, a sulfonic acid group or a group of its salt in which the polar group is bonded to an aromatic ring directly or indirectly via polymethylene group having not more than 4 carbon atoms or a straight-chain hydrocarbon group having an unsaturated bond and having not more than 4 carbon atoms. It is necessary that at least one polar group is bonded to an aromatic group directly or indirectly in the above-mentioned compound. Accordingly, two or more polar groups may be bonded to the aromatic group.

The compound having the above-mentioned polar group, namely, a carboxylic acid, a salt of a carboxylic acid, a sulfonic acid, or a salt of a sulfonic acid has a property of being adsorbed by or bonded to a metal surface due to the polar group, and hence it is presumed that the above-mentioned acid compound or its salt mainly exists in such a manner that the acid compound or its salt is adsorbed by or bonded to the surface of the ferromagnetic powder in the magnetic recording layer.

Accordingly, also presumed is that the surface of the ferromagnetic powder is in a state as if it were coated with an aromatic ring, so that the affinity of the ferromagnetic powder for the resin component is enhanced, whereby the ferromagnetic powder is well dispersed in the magnetic recording layer.

When the compound having the polar group is adsorbed by or bonded to a metal surface owing to the polar group, the polar group is electrostatically charged with negative charge. Therefore, a compound having a structure in which the polar group is easily charged electrostatically with negative charge owing to electron-drawing properties of the aromatic ring is preferably utilized in the present invention.

Examples of the compound having the polar group employable in the invention are as follows:

(1) a carboxylic acid, a salt thereof, a sulfonic acid or a salt thereof in which the polar group is directly bonded to an aromatic ring;

(2) a carboxylic acid, a salt thereof, a sulfonic acid or a salt thereof in which the polar group is bonded to an aromatic ring indirectly by way of a polymethylene group having not more than 4 carbon atoms; and (3) a carboxylic acid, a salt thereof, a sulfonic acid or a salt thereof in which the polar group is bonded to an aromatic ring indirectly by way of a straight-chain hydrocarbon group having an unsaturated bond and having not more than 4 carbon atoms.

In the invention, favorable electron-drawing properties of the aromatic ring for the polar group are given when a group possibly existing between the polar group and the aromatic group has a smaller number of carbon atoms. The above-mentioned compound (3) preferably is a compound in which the unsaturated bond exists at a position where a resonance structure can be formed between the aromatic ring and the polar group.

Examples of the polar groups in the above-mentioned compounds include $-COOM^2$ and/or $-SO_3M^2$ in which $M^2$ generally is hydrogen or an alkali metal atom. When $M^2$ is an alkali metal atom, the alkali metal atom preferably is sodium or potassium.

The carboxylic acid, a salt thereof, a sulfonic acid or salt thereof employable in the invention may be a compound having one aromatic ring, such as a substituted benzene or a compound having two or more aromatic rings such as a substituted naphthalene and a substituted anthracene or phenantherene. Otherwise, it can be a compound having an aromatic ring which contains other ring than the benzene ring such as indene or tetralin. Further, it may be a compound having an aromatic ring which has a substituent such as an alkyl group (preferably having 1-5 carbon atoms).

Representative examples of the acid compounds or salts thereof employable in the invention are as follows.

Examples of the above-mentioned acid compound (or salt thereof) (1) include:

(I) acid compounds having $-COOH$ and salts thereof such as benzoic acid, (o, m or p)-toluic acid, p-t-butyl benzoic acid, phthalic acid, isophthalic acid, terephthalic acid, ($\alpha$ or $\beta$)-naphthoic acid, sodium salts thereof and potassium salts thereof; and (II) acid compounds having $-SO_3H$ and salts thereof such as benzenesulfonic acid, (o, m or p)-toluenesulfonic acid, (m or p)-benzenesulfonic acid, ($\alpha$ or $\beta$)-naphthalenesulfonic acid, sodium salts thereof and potassium salts thereof.

Examples of the above-mentioned acid compound (or salt thereof) (2) include:

(III) acid compounds having $-COOH$ and salts thereof such as phenyl acetic acid, phenyl propionic acid, sodium salts thereof and potassium salts thereof; and (IV) acid compounds having $-SO_3H$ and salts thereof such as:

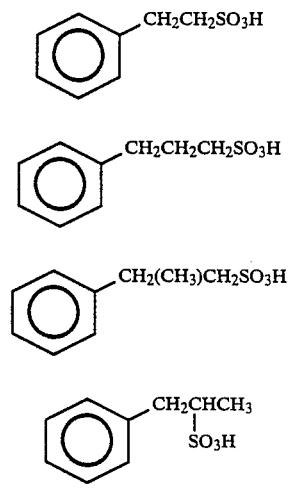

sodium salts thereof and potassium salts thereof.

Examples of the above-mentioned acid compound (or salt thereof) (3) include:

(V) acid compounds having —COOH and salts thereof such as cinnamic acid, sodium salts thereof and potassium salts thereof; and (VI) acid compounds having —SO$_3$H and salts thereof such as

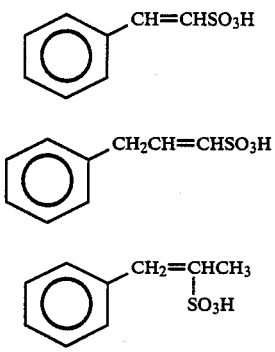

sodium salts thereof and potassium salts thereof.

Other compounds having two or more functional groups can be also employed than the above-described ones. Examples of such compounds are as follows:

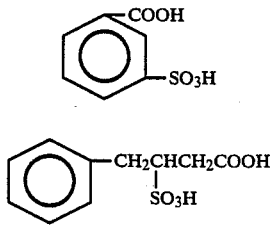

In the invention, preferably employed are acid compounds or salts thereof in which a carboxylic group (—COOH) is directly bonded to an aromatic ring. Among those compounds, benzoic acid is most preferred. An alkali metal salt of benzoic acid can be also used as well as benzoic acid, and in this case, sodium benzoate is generally employed.

The above-described acid compound or salt thereof is contained in the magnetic recording layer in an amount of generally 0.03 to 10 parts by weight based on 100 parts by weight of the ferromagnetic powder. Where the amount thereof is in the range of 0.04 to 7 parts by weight, the ferromagnetic powder is well dispersed in the recording layer, resulting in increased glossiness of the surface of the magnetic recording layer. Particularly where the amount thereof is in the range of 0.05 to 5 parts by weight, the electromagnetic conversion characteristics can be remarkably enhanced. When the amount of the acid compound or salt thereof is less than 0.03 parts by weight, effective results by incorporation thereof can be hardly obtained. Even where the acid compound or salt thereof is contained in an amount of more than 10 parts by weight, there occurs no noticeable enhancement of dispersibility of the ferromagnetic powder.

For enhancing the dispersibility of the ferromagnetic powder by incorporating the above-mentioned acid compound or salt thereof into the magnetic recording layer, there can be utilized a method of adding a ferromagnetic power to a solution or a dispersion containing the acid compound or salt thereof in a low-boiling organic solvent, removing the organic solvent from the resulting mixture to obtain a pre-treated ferromagnetic powder, and preparing a magnetic recording medium using the pretreated ferromagnetic powder. Otherwise, a method of introducing the acid compound or salt thereof into a portion of a solvent for the preparation of a magnetic paint in the dissolved or dispersed form, and kneading or dispersing the resulting mixture to prepare a magnetic paint can be also utilized.

The recording layer of the magnetic recording medium according to the invention preferably contains a fatty acid. The fatty acid generally serves as a lubricant in the recording layer, and it also serves to enhance the dispersibility of the ferromagnetic powder in the preparation of a magnetic paint.

The fatty acid is contained in the magnetic recording layer in an amount of generally 0.1 to 5 parts by weight, preferably 0.3 to 4 parts by weight, based on 100 parts by weight of the ferromagnetic powder.

Examples of the fatty acids employable in the invention include caprilic acid, lauric acid, undecylic acid, myristic acid, plamitic acid, stearic acid, behenic acid, montanic acid, oleic acid, elaidic acid, linoleic acid, linolenic acid and stearolic acid.

If the fatty acid is used in combination with a fatty acid ester as a lubricant, the lubricity can be highly enhanced.

The fatty acid ester is generally employed in an amount of 0.1 to 5 parts by weight, preferably 0.3 to 4 parts by weight, based on 100 parts by weight of the ferromagnetic powder.

In the case of using a combination of the fatty acid and the fatty acid ester, the ratio therebetween is generally in the range of 1:9 to 9:1 (fatty acid:fatty acid ester), by weight.

Examples of the fatty acid ester employable in the invention include butyl myristate, methyl myristate, butyl stearate, ethyl palmitate, buthoxyethyl palmitate and buthoxyethyl stearate.

The magnetic recording layer of the recording medium of the present invention generally contains an abrasive such as $\alpha$-Al$_2$O$_3$ and an antistatic agent such as carbon black.

A process for the preparation of a magnetic recording medium of the present invention is described below.

The above-mentioned ferromagnetic powder and binder (and the above-mentioned other additives, if desired) are dispersed in an organic solvent generally employed such as methyl ethyl ketone or cyclohexanone to prepare a magnetic paint. The magnetic paint is then coated over a nonmagnetic support in such a manner that the coated layer would generally have a thickness of 0.2 to 10 $\mu$m in dry basis. The magnetic recording layer provided on the support is generally subjected to various treatments such as a magnetic orientation, a drying process, a surface smoothing process, a curing process and a cutting process according to known methods. Thus, a magnetic recording medium of the present invention can be prepared.

In performing the above-described procedures, the aforementioned acid compound or salt thereof is incorporated into the magnetic recording layer by using a pretreated ferromagnetic powder or adding the acid compound or salt thereof to the magnetic paint as described hereinbefore.

The magnetic recording layer is generally provided on the nonmagnetic support by directly coating a magnetic paint to the surface of the support, but it is possible to provide an adhesive layer or a subbing layer to combine the magnetic recording layer with the nonmagnetic support.

A process for the preparation of a magnetic paint, a coating process of the magnetic paint, a magnetic orientation, drying process, surface smoothing process, curing process, etc. are already known, and the magnetic recording medium of the present invention can be prepared according to the known processes.

Examples and comparison example for the invention are given below. In the following examples, the expression "part(s)" means "part(s) by weight", unless otherwise specified.

EXAMPLE 1

| Composition of Magnetic Paint | |
|---|---|
| Ferromagnetic metal alloy powder | 100 parts |
| (Fe—Zn—Ni alloy, | |
| Fe: 94 wt. %, Zn: 4 wt. %, Ni: 2 wt. %, | |
| Hc: 1,500 Oe, specific surface | |
| area: 54 m$^2$/g) | |
| Vinyl chloride copolymer | 12 parts |
| Polyurethane resin | 8 parts |
| α-A$_2$OS | 5 parts |
| Stearic acid | 2 parts |
| Butyl stearate | 2 parts |
| Methyl ethyl ketone | 125 parts |
| Toluene | 125 parts |
| Benzoic acid | 0.05 part |

To a portion of tluene indicated above was added benzoic acid also indicated above to prepare a 20 wt.% toluene solution of benzoic acid.

The obtained toluene solution and the remaining components indicated above were kneaded in a ball mill for 48 hours to give a homogeneous dispersion. To the dispersion was added 8 parts of a polyisocyanate compound (Desmodule L, tradename, available from Bayer AG), and the dispersion was further kneaded for one hour. The dispersion was then filtered over a filter having mean pore size of 1 μm to give a magnetic paint. The magnetic paint was coated over a polyethylene terephthalate support (thickess: 10 μm) to give a coated layer having thickness of 4.0 μm (thickness in dry state) by means of a reverse roll.

The nonmagnetic support with the coated layer was treated with an electromagnet at 3,000 gauss under wet condition to give a magnetic orientation. After the coated layer was dried, the dried layer was subjected to supercalendering. The resulting sheet was slit into width of 8 mm to prepare an 8 mm type video tape.

The above-listed vinyl chloride copolymer and polyurethane resin were prepared by the following processes.

Vinyl chloride copolymer

Into a 500-ml stainless autoclave equipped with a magnetic induction stirrer and a pressure indicator were introduced 300 ml of nitrogen-substituted distilled water dissolving 0.6 g. of polyvinyl alcohol, 0.15 g. of azobisisobutyronitrile, 16.6 g. of glycidyl methacrylate and 8.0 g. of sodium 2-acrylamido-2-methylpropanesulfonate, and the autoclave is covered with a lid. The autoclave is then allowed to cool in a dry ice-methanol bath to lower a temperature within the autoclave to −20° C.

Subsequently, the autoclave was charged with nitrogen gas to substitute a gas in the autoclave by the nitrogen gas, and then rapidly introduced 100 g. of a cooled liquid vinyl chloride. The components in the autoclave were stirred for approx. 15 min. at elevating temperature inside the autoclave to 60° C. to perform a polymerization reaction.

All of the reactive components in the autoclave were consumed to lower the pressure inside the autoclave so as to complete the polymerization reaction.

After lowering of the pressure, the autoclave was cooled to room temperature, and nitrogen was introduced into the autoclave to remove the remaining vinyl chloride. The obtained product was taken out of the autoclave. The product was then sufficiently washed with water and filtered to obtain a white powder of the polymerization product. The polymerization product was then dried under vacuum at 40° C. for 12 hours.

As a result of elemental analysis, thus obtained product was confirmed to be a vinyl chloride copolymer in which vinyl chloride, sodium 2-acrylamido-2-methylpropanesulfonate and glycidyl methacrylate were polymerized in a molar ratio of 87.5:2.5:10 (vinyl chloride:sodium 2-acrylamido-2-methylpropanesulfonate:glycidyl methacrylate).

The obtained vinyl chloride copolymer was measured on an intrinsic viscosity [η] by the use of methyl ethyl ketone. The intrinsic viscosity thereof was 0.21.

Polyurethane resin

Into a reactor equipped with a thermometer, a stirrer and a partial reflux condenser were introduced 582 g. of dimethyl terephthalate, 157 g. of dimethyl 5-sodium sulfoisophthalate, 434 g. of ethylene glycol, 728 g. of neopentyl glycol, 0.66 g. of zinc acetate and 0.08 g. of sodium acetate, to perform a reaction at a temperature of 140° to 220° C. for 2 hours. To the reaction product in the reactor was further added 1,212 g. of sebacic acid to carry out a reaction for 2 hours. Then the pressure of the reaction system was reduced to 20 mmHg for 30 min., and the polymerization reaction was carried out at a pressure of 5–20 mmHg and a temperature of 250° C. for 50 min. to produce polyester polyol.

In the obtained polyester polyol, terephthalic acid, dimethyl 5-sodium sulfoisophthalic acid, sebacic acid, ethylene glycol and neopentyl glycol are bonded to each other in a molar ratio of 15.3:2.9:30.7:22.5:28.6 (terephthalic acid:dimethyl 5-sodium sulfoisophthalic acid:sebacic acid:ethylene glycol:neopentyl glycol).

Into the same reactor as described above were introduced 1,000 g. of the polyester polyol obtained above, 1,280 g. of toluene, 850 g. of methyl isobutyl ketone, 71 g. of diphenylmethane diisocyanate and 1.2 g of dibutyl tin dilaurate, to perform a reaction at a temperature of 70°–90° C. for 8 hours so as to produce a polyurethane resin. In the obtained polyurethane resin, dimethyl 5-sodiumsulfoisophthalate was polymerized in an amount of 0.25 mol%.

EXAMPLE 2

The procedure of Example 1 was repeated except for varying the amount of benzoic acid to 1.0 part to prepare an 8 mm type video tape.

EXAMPLE 3

The procedure of Example 1 was repeated except for varying the amount of benzoic acid to 5.0 parts to prepare an 8 mm type video type.

EXAMPLE 4

The procedure of Example 1 was repeated except for varying the amount of benzoic acid to 8.0 parts to prepare an 8 mm type video tape.

COMPARISON EXAMPLE 1

The procedure of Example 1 was repeated except for not using benzoic acid to prepare an 8 mm type video tape.

EXAMPLE 5

In 99 parts of methyl ethyl ketone was dissolved 1 part of benzoic acid. To 25 parts of the solution was added 100 parts of the same ferromagnetic metal alloy powder as used in Example 1, and the resulting mixture was then heated to remove methyl ethyl ketone from the mixture. Thus, a ferromagnetic alloy having been treated with the benzoic acid was prepared. As a result of elemental analysis, the amount of the benzoic acid contained in the ferromagnetic alloy powder was 0.2% by weight.

The procedure of Example 1 was repeated except for using the above-obtained ferromagnetic alloy powder having been treated with benzoic acid and not adding benzoic acid in the kneading procedure, to prepare an 8 mm type video tape.

The video tapes obtained in Examples 1 to 5 and Comparison Example 1 were evaluated with respect to glossiness of the surface thereof, maximum residual flux density, squareness ratio and C/N ratio according to the following tests. The results are set forth in Table 1.

(1) Surface glossiness

The measurement of the glossiness was done at an incidence angle of 45° and a reflection angle of 45° by means of a standard glossmeter (produced by Suga Testing Machine Co., Ltd.). The values set forth in Table 1 were relative values in the case of a surface glossiness of a magnetic recording layer of the magnetic recording medium obtained in Comparison Example 1 being 100%.

(2) Maximum residual flux density (Bm) and squareness ratio (SQ)

Magnetic properties of the magnetic recording media were measured at Hm of 5 kOe by means of a vibrating sample magnetic flux measuring machine (VSM-type, produced by Toei Industries Co., Ltd.).

(3) C/N ratio

A signal of 5 MHz were recorded using a commercially available 8 mm type video tape recorder (Fujix-8), and the signal was reproduced to measure a noise occurring in the range of 5±1 MHz. Then the ratio of noise to the reproduced signal was determined. The measurement was done by using an output level measuring machine (NV-870HD type, produced by Matsushita Electric Industries Co., Ltd.). The values set forth in Table 1 were relative values in the case that the C/N ratio of the magnetic recording medium obtained in Comparison Example 1 was set to 0 dB.

TABLE 1

|  | Glossiness (%) | Bm (gauss) | SQ | C/N Ratio (dB) |
|---|---|---|---|---|
| Example 1 | 117 | 3,160 | 0.85 | +2.1 |
| Example 2 | 125 | 3,370 | 0.87 | +3.5 |
| Example 3 | 121 | 3,300 | 0.85 | +3.2 |
| Example 4 | 103 | 3,200 | 0.84 | +0.8 |
| Example 5 | 120 | 3,210 | 0.86 | +2.2 |
| Com. Example 1 | 100 | 2,900 | 0.81 | 0 |

We claim:

1. A magnetic recording medium comprising a nonmagnetic support and a magnetic recording layer provided on the support, said magnetic recording layer comprising a binder and a ferromagnetic powder dispersed therein, wherein:

said binder comprises a vinyl chloride polymer containing 0.001 to 5.0 mol% of a repeating unit having a polar group selected from the group consisting of $-COOM^1$, $-SO_3M^1$, $-OSO_3M^1$, and $-PO(OM^1)_2$ wherein $M^1$ is hydrogen or an alkali metal atom and a polyurethane containing 0.001 to 5.0 mol% of a repeating unit having a polar group selected from the group consisting of $-COOM^1$, $-SO_3M^1$, $-OSO_3M^1$, and $-PO(OM^1)_2$ wherein $M^1$ is hydrogen or an alkali metal atom; and said magnetic recording layer further contains 0.03 to 10 parts by weight of a compound having a polar group based on 100 parts by weight of the ferromagnetic powder, said compound having a polar group being selected from the groups consisting of benzoic acid, phthalic acid, isophthalic acid, terephthalic acid, naphthoic acid, benzenesulfonic acid, naphthalenesulfonic acid, a sodium salt thereof, and a potassium salt thereof.

2. The magnetic recording medium as claimed in claim 1, wherein said compound having a polar group is a benzoic acid or a sodium salt thereof.

3. The magnetic recording medium as claimed in claim 1, wherein said compound having a polar group is contained in an amount of 0.5 to 5 parts by weight based on 100 parts by weight of the ferromagnetic powder.

4. The magnetic recording medium as claimed in claim 1, wherein said ferromagnetic powder is pretreated with said compound having a polar group.

5. The magnetic recording medium as claimed in claim 1, wherein said vinyl chloride copolymer further contains 1 to 30 mol% of a repeating unit having an epoxy group.

6. A magnetic recording medium comprising a nonmagnetic support and a magnetic recording layer provided on the support, said magnetic recording layer comprising a binder and a ferromagnetic powder dispersed therein, wherein:

said binder comprises a vinyl chloride copolymer containing 0.001 to 5.0 mol% of a repeating unit having a polar group selected from the group consisting of $-COOM^1$, $-SO_3M^1$, $-OSO_3M^1$ and $-PO(OM^1)_2$ wherein $M^1$ is hydrogen or an alkali metal atom and a polyurethane containing 0.001 to 5.0 mol% of a repeating unit having a polar group selected from the group consisting of $-COOM^1$, $-SO_3M^1$, $-OSO_3M^1$, and $-PO(OM^1)_2$ wherein $M^1$ is hydrogen or an alkali metal atom, and said magnetic recording layer further contains 0.03 to 10 parts by weight of an aromatic compound having a polar group based on 100 parts by weight of the ferromagnetic powder, said polar group being selected from the groups consisting of a carboxylic acid group, a carboxylic acid salt group, a sulfonic acid group and a sulfonic acid salt group, and being bonded to an aromatic ring of the compound through a polymethylene group having not more than 4 carbon atoms or an unsaturated straight-chain hydrocarbon group having not more than 4 carbon atoms.

7. The magnetic recording medium as claimed in claim 6, wherein said compound having a polar group is contained in an amount of 0.05 to 5 parts by weight based on 100 parts by weight of the ferromagnetic powder.

8. The magnetic recording medium as claimed in claim 6, wherein said ferromagnetic powder is pretreated with said compound having a polar group.

9. The magnetic recording medium as claimed in claim 6, wherein said vinyl chloride copolymer further contains 1 to 30 mol% of a repeating unit having an epoxy group.

* * * * *